United States Patent
Kim et al.

(10) Patent No.: US 8,112,411 B2
(45) Date of Patent: Feb. 7, 2012

(54) METHOD AND SYSTEM FOR PROVIDING SEARCH RESULTS

(75) Inventors: Young Kwan Kim, Seongnam (KR); Tae Ho Lee, Seoul (KR)

(73) Assignee: NHN Corporation, Seongnam-si (KR)

( * ) Notice: Subject to any disclaimer, the term of this patent is extended or adjusted under 35 U.S.C. 154(b) by 466 days.

(21) Appl. No.: 12/139,655

(22) Filed: Jun. 16, 2008

(65) Prior Publication Data

US 2008/0313157 A1    Dec. 18, 2008

(30) Foreign Application Priority Data

Jun. 18, 2007    (KR) ........................ 10-2007-0059232

(51) Int. Cl.
    *G06F 17/30* (2006.01)
(52) U.S. Cl. ...................................................... 707/708
(58) Field of Classification Search .......... 707/687–691, 707/705–712, 723–735, 748–759; 709/201–203, 709/227
    See application file for complete search history.

(56) References Cited

U.S. PATENT DOCUMENTS

| | | | | |
|---|---|---|---|---|
| 2004/0034707 | A1* | 2/2004 | Royer | 709/227 |
| 2005/0004978 | A1* | 1/2005 | Reed et al. | 709/203 |
| 2007/0022289 | A1* | 1/2007 | Alt et al. | 713/168 |
| 2008/0059507 | A1* | 3/2008 | Najork | 707/102 |

FOREIGN PATENT DOCUMENTS

| | | |
|---|---|---|
| JP | 2001-337973 | 12/2001 |
| KR | 2001-0060361 | 7/2001 |
| KR | 2001-0106595 | 12/2001 |

OTHER PUBLICATIONS

Wasuke Hilragi, Tetsuo Sakaguchi, LM-5 User assistance of choosing results of retrieving WWW pages, Forum for Information Technology (FIT) 2002, Sep. 13, 2002, pp. 221-222, vol. 1, 2002, The Institute of Electronics, Information and Communication Engineers and Information Processing Society of Japan, Japan.

* cited by examiner

*Primary Examiner* — Wilson Lee
(74) *Attorney, Agent, or Firm* — H.C. Park & Associates, PLC

(57) ABSTRACT

A method and system for providing search results only inclusive of valid webpage(s) to a user is disclosed, the method comprising: receiving a first search query from a first user; providing to the first user first search results obtained in response to the first search query; determining whether a webpage selected by the first user from the first search results is valid or not; receiving a second search query from a second user; providing to the second user second search results obtained in response to the second search query if it is determined that the webpage selected by the first user is valid; and correcting the second search results obtained in response to the second search query and providing the corrected second search results to the second user if it is determined that the webpage selected by the first user is not valid and is included in the second search results.

20 Claims, 7 Drawing Sheets

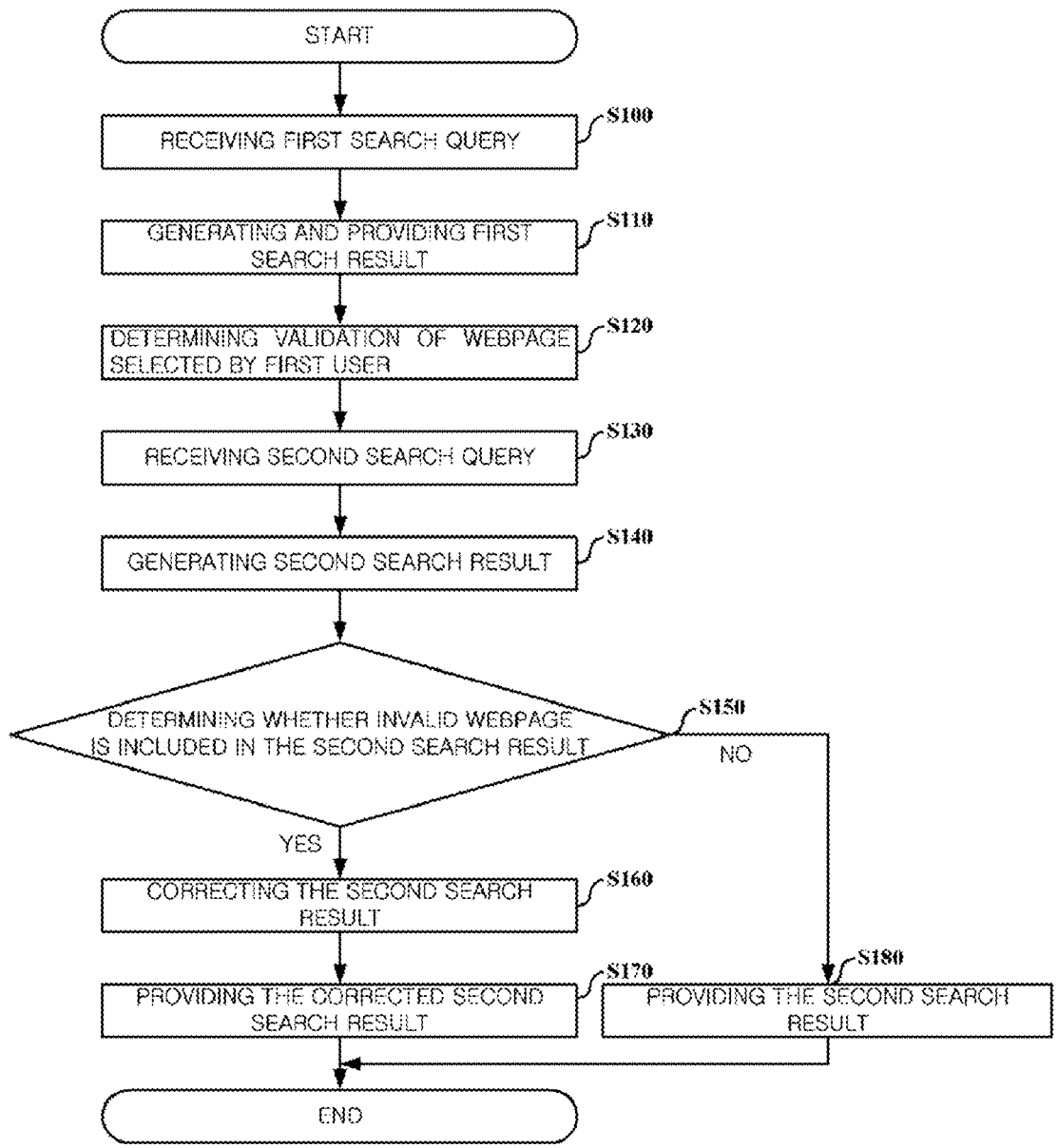

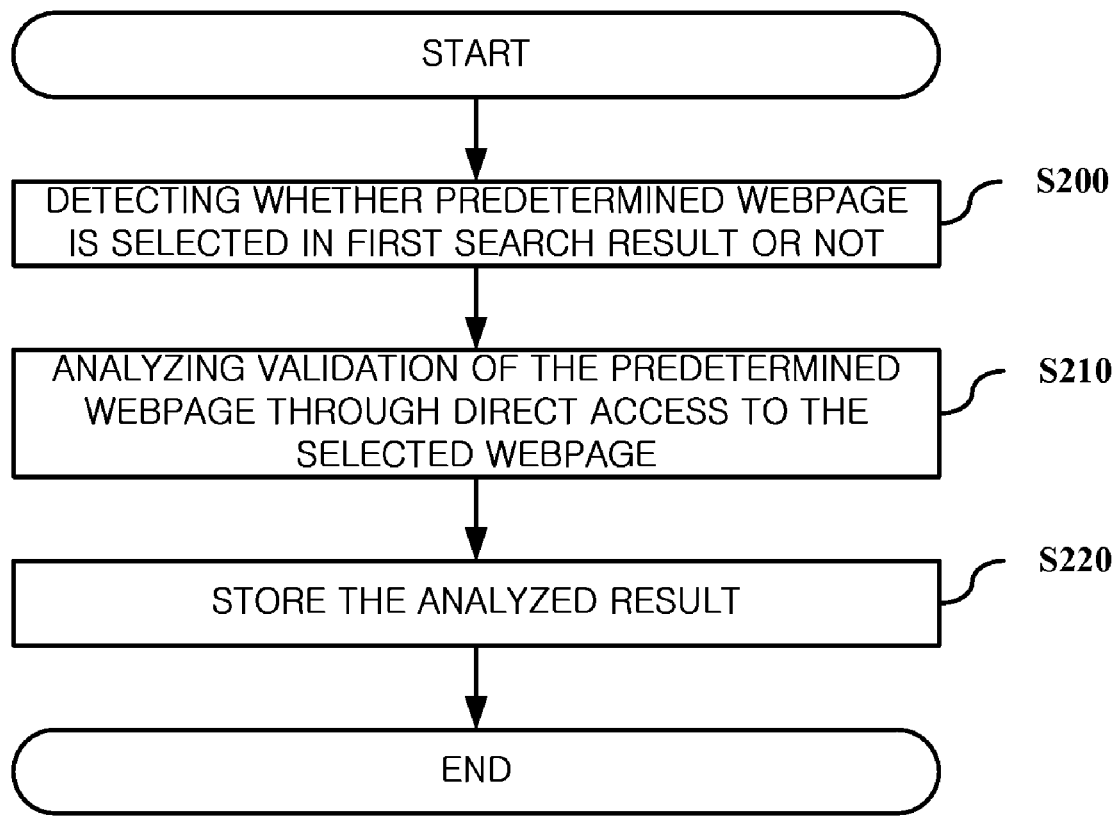

METHOD AND SYSTEM FOR PROVIDING
> SEARCH RESULTS

CROSS-REFERENCE TO RELATED APPLICATION

This application claims the benefit of Korean Patent Application No. 10-2007-0059232, filed on Jun. 18, 2007, which is hereby incorporated by reference as if fully set forth herein.

TECHNICAL FIELD

The present invention relates to a method and a system for providing search results only inclusive of valid webpage(s) to a user.

BACKGROUND ART

Development and widespread use of Internet have brought various kinds of online services, one of which is a search service.

Typically, the search service is provided such that a query is inputted by a service user and search results in response to the query are provided. More specifically, a service provider builds a database with webpages pre-stored by each index. When the service user requests a search service, the service provider searches the webpages stored in the database, and provides corresponding search results to the service user.

However, the prior art search service providing method has disadvantages. For example, it performs a search process for all of the pre-stored webpages even though a target webpage has been changed. Thus, the search results provided to the service user may include webpage(s) irrelevant to the search query by the service user or webpage(s) having been deleted.

In more detail, as shown in FIG. 1A, when the service user inputs a search query (4) of "beautiful man and beautiful success," the search results obtained in response to the search query is provided to the service user. Then, when the service user selects any one of link information from the obtained search results, the webpage corresponding to the selected link information is displayed.

However, when the webpage corresponding to the selected link information has been deleted or a server of providing the corresponding webpage has a problem, a webpage informing that the corresponding webpage cannot be provided is displayed on a screen, as shown in FIGS. 1B to 1D. In this case, FIG. 1B is a screen provided when the first link information (6) is selected from FIG. 1A; FIG. 1C is a screen provided when the second link information (8) is selected from FIG. 1A; and FIG. 1D is a screen provided when the third link information (9) is selected from FIG. 1A.

As such, the service user may waste its time and feel inconvenience on unnecessary search, which in turn may cause mistrust of the service provider.

The above information disclosed in this Background Art section is only for enhancement of understanding of the background of the invention and therefore it may contain information that does not form the prior art that is already known in this country to a person of ordinary skill in the art.

SUMMARY OF THE DISCLOSURE

Therefore, the present invention has been made in view of the above problems, and it is an object of the present invention to provide a method and system for providing search results, in which whether a webpage selected by a first user is valid is determined, and the validity determination is reflected in search results to be provided to a second user.

It is another object of the present invention to provide a method and system for providing search results, in which, when a webpage selected by a first user is not valid, the selected webpage is deleted from search results to be provided to a second user, whereby the search results to be provided to the second user includes only valid webpage(s).

It is another object of the present invention to provide a method and system for providing search results, in which, when a webpage selected by a first user is not valid, search results to be provided to a second user can be displayed with information to indicate that the selected webpage is not valid.

The above and additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, the present invention, in one aspect, provides a method of providing search results comprises: receiving a first search query from a first user; providing to the first user first search results obtained in response to the first search query; determining whether a webpage selected by the first user from the first search results is valid or not; receiving a second search query from a second user; providing to the second user second search results obtained in response to the second search query if it is determined that the webpage selected by the first user is valid; and correcting the second search results obtained in response to the second search query and providing the corrected second search results to the second user if it is determined that the webpage selected by the first user is not valid and is included in the second search results.

In another aspect, the present invention provides a method of providing search results comprising: determining whether a webpage selected by a first user is valid or not; receiving a search query from a second user; correcting search results obtained in response to the search query if it is determined that the webpage is not valid and is included in the search results; and providing the corrected search results to the second user.

In still another aspect, the present invention provides a recording medium with a program readable by a computer to execute the above-described method.

In a further aspect, the present invention provides a system for providing search results comprising: an interfacing unit for receiving first and second search queries from first and second user respectively, and providing to the first and second users first and second search results obtained in response to the first and second search queries; a validity determining unit for determining validity of a webpage selected by the first user from the first search results; and a search results correcting unit for correcting the second search results if it is determined by the validity determining unit that the selected webpage is invalid and is included in the second search results.

The above and other features of the invention are discussed infra.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a flowchart showing a method for providing search results through the search results providing system shown in FIG. 2; and FIG. 4 is a flowchart showing a method for determining validity of webpage.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 2:
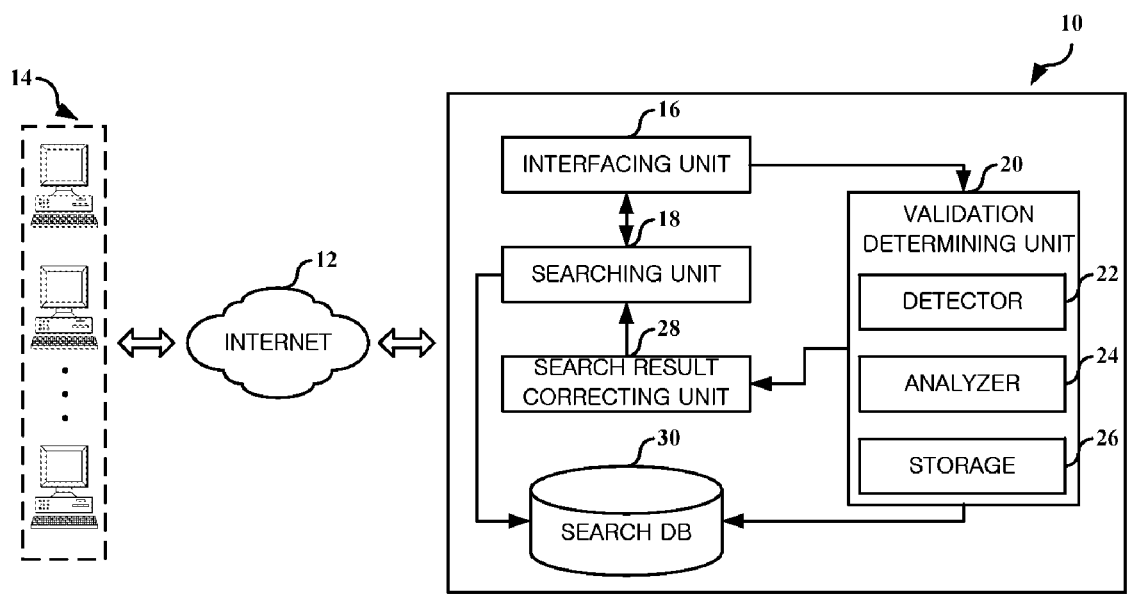
FIG. 2 is a diagram showing a network provided with a search results providing system according to one embodiment of the present invention.

FIG. 2 is a diagram showing a network provided with a search results providing system according to one embodiment of the present invention.

As shown in FIG. 2, the search results providing system 100 receives a search request from a user terminal 14 through Internet 12, and provides to the user terminal 14 search results obtained in response to the received search request. This search results providing system 100 includes an interfacing unit 16, a searching unit 18, a validity determining unit 20, and a search results correcting unit 28.

The interfacing unit 16 receives first and second search queries from first and second users, respectively and then provides the first and second users with first and second results obtained in response to the first and second search queries, respectively.

In this case, the first and second users may be the same person or different persons; and the first search query input by the first user may be the same as or different from the second search query input by the second user.

The searching unit 18 executes a search through the use of search DB 30 regarding the search query received through the interfacing unit 16; obtains search results in response to the corresponding search query; and provides the obtained search results to the corresponding user through the interfacing unit 16.

In a modified embodiment of the present invention, the search results providing system 10 transmits the search results to an additional server which is in charge of search; receives the search results obtained in response to the corresponding search query from the additional server; and provides the received search results to the corresponding user. In this case, the search results providing system 10 may not include the searching unit 18 and the search DB 30. The search results providing system 10 may include an additional interfacing unit (not shown) connected with the additional server.

The validity determining unit 20 determines whether the webpage selected from the first search results by the first user is valid. As shown in the drawings, the validity determining unit 20 includes a detector 22, an analyzer 24 and storage 26.

The detector 22 detects whether a webpage is selected by the first user or not. In one embodiment of the present invention, when the first user selects any one of link information included in the first search results, the detector 22 determines that the webpage corresponding to the link information is selected.

When it is detected by the detector 22 that the corresponding webpage is selected, the analyzer 24 accesses the corresponding webpage and analyzes validity of the corresponding webpage. In this case, validity determination of the corresponding webpage concerns whether the corresponding webpage can be displayed in a normal state or has been changed. Examples of webpages that cannot be displayed in a normal state include a webpage which has been deleted and a webpage which may not be displayed due to problems of the webpage server.

When the corresponding webpage has been deleted or may not be displayed due to the problems of webpage server, or the corresponding webpage has been changed, the analyzer 24 determines that the corresponding webpage is not valid.

Figure 1A:
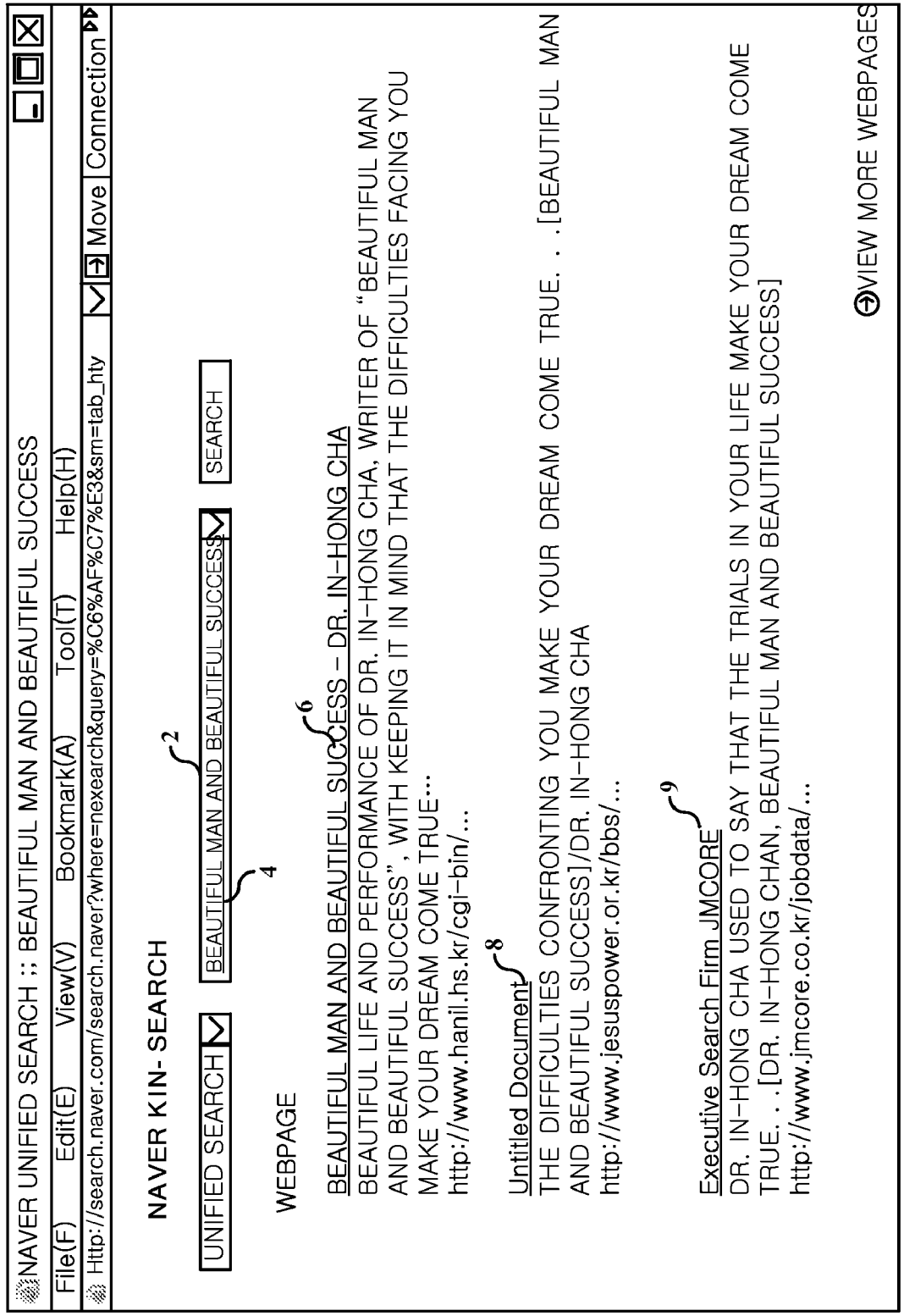
FIG. 1A is a captured screen to provide a general search service.
Figure 1B:
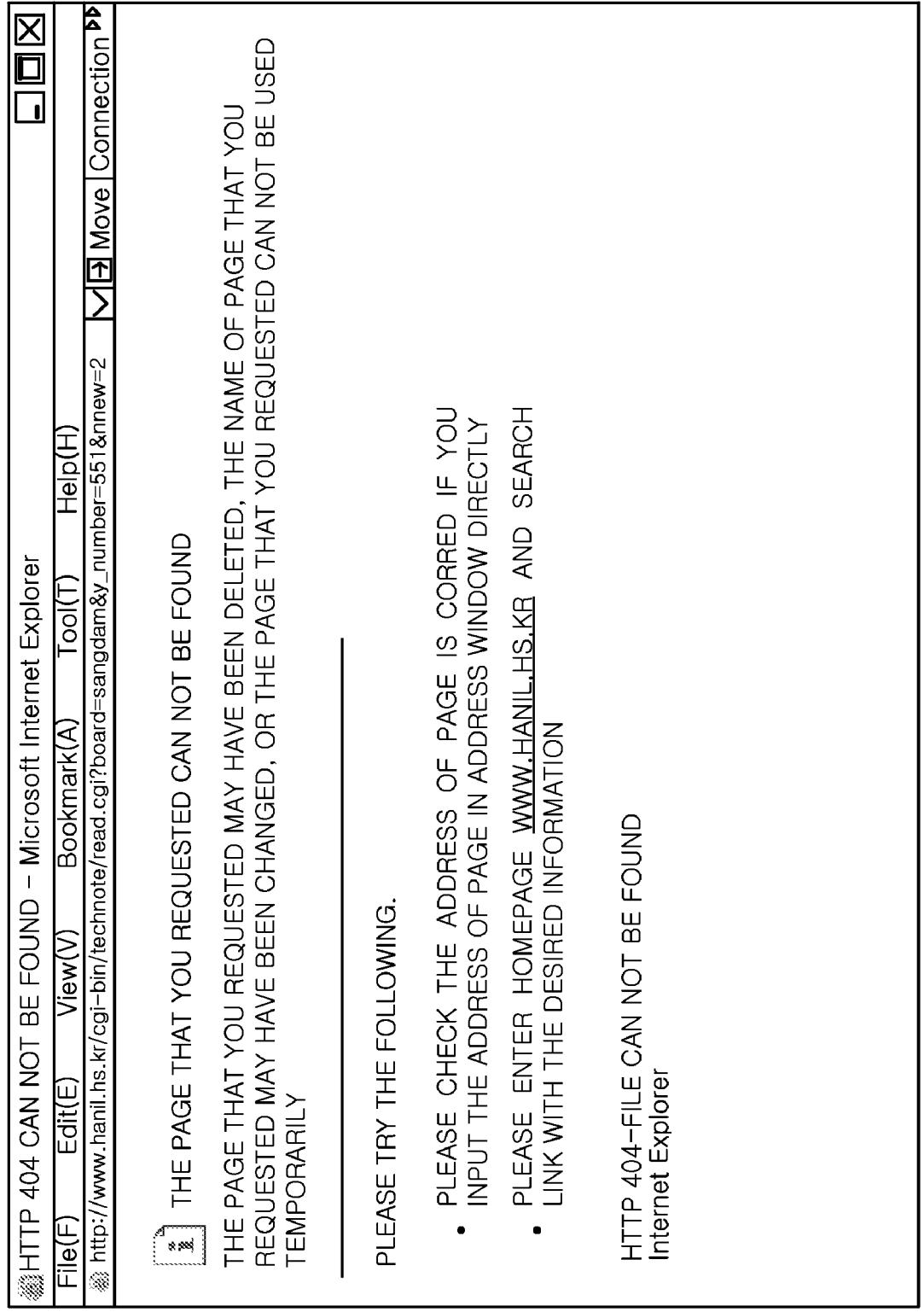
FIGS. 1B and 1D are captured screens to show invalid webpage among search results shown in FIG. 1A.
Figure 1C:
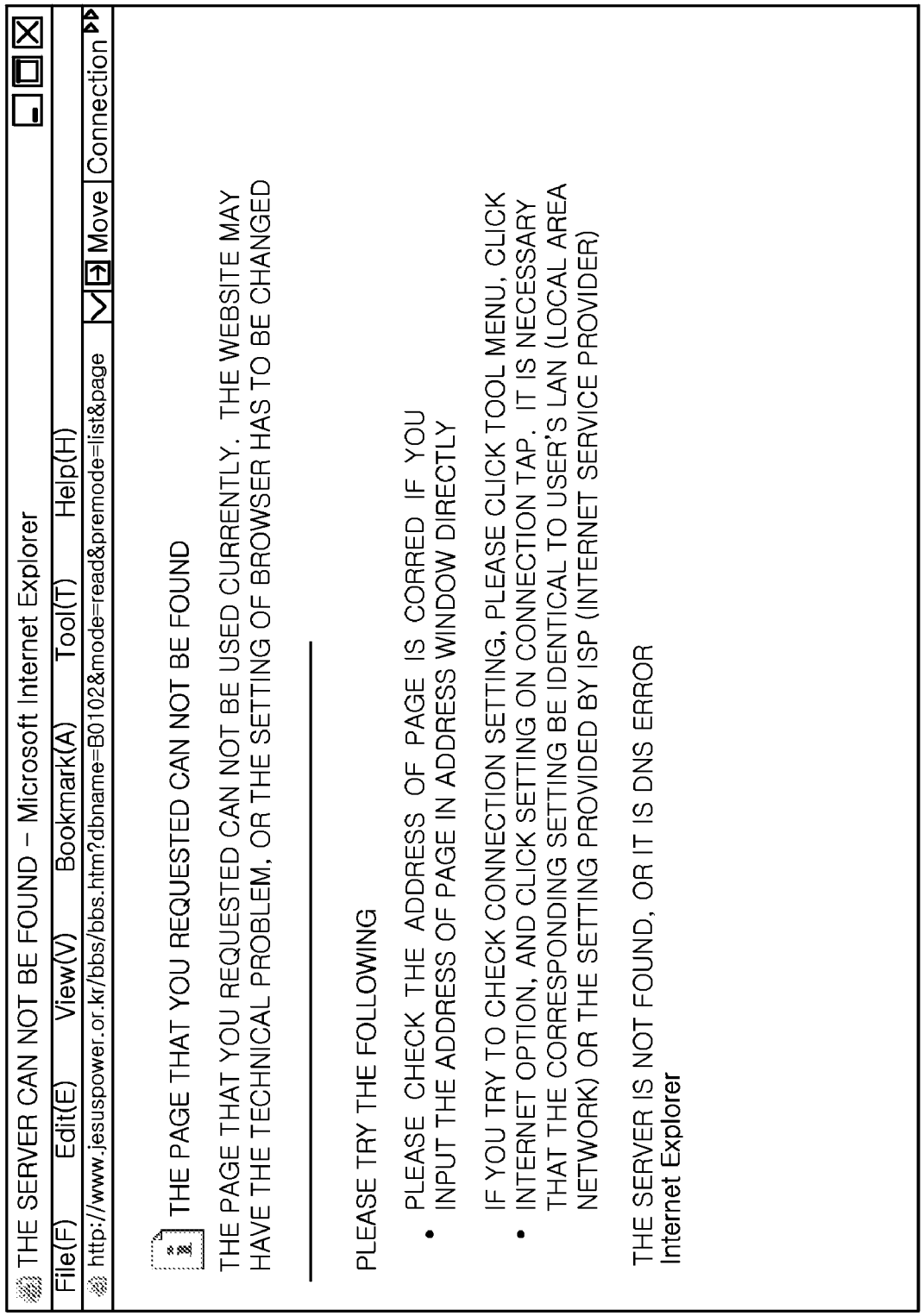
Figure 1D:
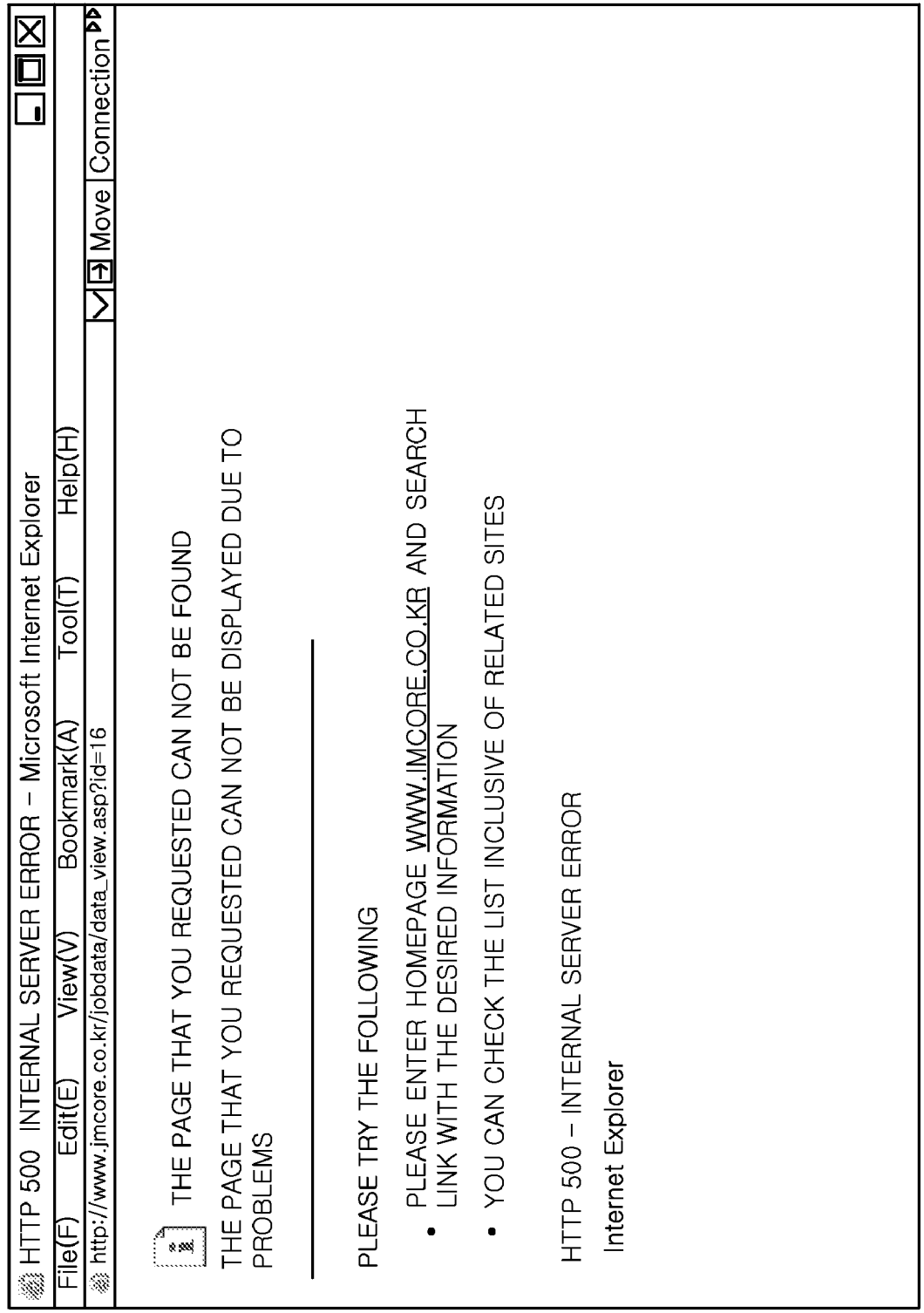

In one embodiment of the present invention, whether the corresponding webpage has been deleted can be determined through the analysis of whether a particular sentence indicating the deletion has been detected is detected in the corresponding webpage or not. For example, as shown in FIG. 1B, if a sentence such as "the corresponding page has been deleted, the name of the corresponding webpage has been changed, or the corresponding webpage cannot be used temporarily" is detected in the corresponding webpage, it is determined that the corresponding webpage has been deleted. Also, the analyzer 24 may form a specific pattern by learning the particular sentences indicating the deletion of webpage; and determines that the corresponding webpage has been deleted when the specific pattern is detected in the corresponding webpage.

Meanwhile, whether the corresponding webpage has been changed can be determined through the analysis of a hash-key value of text included in the corresponding webpage. More particularly, the analyzer 24 can directly access the corresponding webpage and obtain the hash-key value of text included in the corresponding webpage, and compare this hash-key value with the hash-key value of text of the webpage stored in the search DB 30. If the hash-key values are different from each other, it is determined that the corresponding webpage has been changed and is not valid.

While the analyzer 24 analyzes the validity of the corresponding webpage through the direct access to the corresponding webpage in the above embodiment of the present invention, it is noted that information of the webpage selected by the first user may be obtained from a web browser (not shown) included in a user's terminal 14 and the validity of the webpage may be determined through the use of the obtained information.

The storage 26 stores the analysis results by the analyzer 24. In more detail, the validity of the corresponding webpage is mapped to each URL (Uniform Resource Location) of the corresponding webpage, and is then stored in the storage 26. The stored results are reflected in second search results provided to a second user.

When it is determined by the validity determining unit 20 that the corresponding webpage is not valid and the invalid webpage is included in the second search results to be provided to the second user, the search results correcting unit 28 corrects the second search results and provides the corrected search results to the second user.

The correction of the second search results can be made in various ways. For instance, first, the search results correcting unit 28 may correct the second search results by deleting from the second search results the corresponding webpage which has been determined invalid. Second, the search results correcting unit 28 may correct the second search results by inserting into the second search results information indicating that the corresponding webpage is not valid (e.g., by inserting a particular icon to the start of link information indicating the corresponding webpage). Third, the search results correcting unit 28 may sort out the invalid webpage from the second search results and display the invalid webpage in a predetermined area of the second search results.

In the second and third examples above, if the corresponding webpage was temporarily invalid and it is determined that the corresponding webpage is valid, the corresponding webpage will be displayed as a valid webpage.

Meanwhile, when it is determined that the corresponding webpage has been changed, the webpage stored in the search DB 30 may be updated by the webpage obtained by the analyzer 24, whereby the current webpage is reflected in the search results.

While the second search results can be corrected as described above, it is also possible to delete the invalid webpage when generating the second search results or insert the information informing that the corresponding webpage is not valid into the second search result. Accordingly, the function of search results correcting unit 28 may be executed by the searching unit 18.

Also, while the webpage selected by the first user can be a webpage included in the first search results obtained in response to the first search query as described above, the webpage selected by the first user is not limited to the webpage included in the search results. For example, the webpage selected by the first user may be any one of the webpages provided by a portal site.

A method of providing search results through the use of the aforementioned system will be explained with reference to FIG. 3.

First, on receiving the first search query from the first user (S100), the first search results are generated in response to the first query and provided to the first user (S100). Then, it is determined whether the webpage selected by the first user from the first search results is valid or not (S120).

As shown in FIG. 4, the process of determining the validity of the corresponding webpage comprises steps of: detecting whether the corresponding webpage is selected by the first user from the first search results (S200); analyzing the validity of the corresponding webpage through the direct access to the corresponding webpage when it is determined that the corresponding webpage is selected by the first user (S210); and storing the analysis result in predetermined storing means (S220).

In this case, the validity of the corresponding webpage concerns whether the corresponding webpage can be displayed in a normal state or has been changed. Examples of the webpages which cannot be displayed in a normal state include a webpage that has been deleted and a webpage that cannot be displayed due to problems of webpage server. When the corresponding webpage cannot be displayed in a normal state or has been changed, it is determined that the corresponding webpage is not valid.

Preferably, whether the corresponding webpage has been changed is determined based on the hash-key value of text included in the corresponding webpage. In detail, the hash-key value of text of webpage stored in the search DB 30 is compared with the hash-key value of text included in the webpage obtained by the analyzer 24. If the hash-key values are different, it is determined that the corresponding webpage has been changed and is not valid.

Referring to FIG. 3, the second search query is received from the second user (S130). The second search query may be identical to or different from the first search query. By performing the search through the use of second search query, the second search results are generated in response to the second search query.

It is determined whether a webpage that has been determined to be invalid is included in the second search results (S150). When the invalid webpage is included in the second search results, the second search results are corrected (S160).

The correction of the second search results, as discussed above, can be made in various ways. For example, the corresponding webpage can be deleted from the second search results so as not to be displayed in the second search results. Also, the information informing that the corresponding webpage is not valid can be inserted into the second search results. In addition, the invalid webpages may be displayed in a predetermined area of the second search results. After that, the corrected second search results are provided to the second user (S170).

Meanwhile, when it is determined that the invalid webpage is not included in the second search results, the second search results generated in the step of S140 is provided to the second user (S180).

While the webpage selected by the first user can be included in the first search results obtained in response to the first search query, the webpage selected by the first user is not limited to the webpage included in the search results. For example, the webpage selected by the first user may be any one among the webpages provided by a portal site. In this case, the steps of S100 and S110 may be omitted, it is determined in the step of S120 whether the webpage selected by the first user is valid or not, and it is detected in the step of S200 whether the webpage is selected by the first user or not.

The aforementioned search results providing method may be realized as programs executed in various computers. In this case, the programs for executing the search results providing method are stored in a computer readable recording medium, for example, hard-disc, CD-ROM, DVD, ROM, RAM or flash memory.

The present search results providing methods and systems achieve various advantages including the following. For example, the validity of only the webpage selected by the first user can be determined, thereby resulting in the high efficiency of search service. The webpages having been determined to be invalid in the search results provided to the first user are deleted from the search results to be provided to the second user or displayed that the webpages are not valid, thereby resulting in the high reliability of search service. Also, when the webpages having been determined to be temporarily invalid are determined to be valid, they can be displayed as valid, thereby resulting in the high reliability of search service.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of providing search results comprising:
receiving a first search query from a first user;
providing the first user with first search results obtained in response to the first search query;
determining whether a webpage selected by the first user from the first search results is valid, the validity of the webpage being determined based on analysis of text content of the selected webpage;
receiving a second search query from a second user, wherein second search results obtained in response to the second search query comprise the webpage selected by the first user;
providing the second user with the second search results if it is determined that the webpage selected by the first user is valid; and
correcting the second search results obtained in response to the second search query and providing the second user with the corrected second search results if it is determined that the webpage selected by the first user is not valid.

2. The method according to claim 1, wherein the determining whether the selected webpage is valid comprises:
detecting whether the webpage is selected by the first user;
accessing, if it is detected that the webpage is selected by the first user, the selected webpage and analyzing validity of the selected webpage; and
storing analysis results.

3. The method according to claim 1, wherein the correcting the second search results is performed by deleting link information of the webpage having been determined to be invalid from the second search results.

4. The method according to claim 1, wherein the correcting the second search results is performed by inserting into the second search results information that the webpage having been determined to be invalid is not valid.

5. The method according to claim 1, wherein the determining whether the selected webpage is valid is performed by determining whether the selected webpage has been deleted.

6. The method according to claim 5, wherein whether the selected webpage has been deleted is determined by searching the selected webpage for a particular pattern indicating deletion of the webpage.

7. The method according to claim 1, wherein the determining whether the selected webpage is valid is performed by determining whether text content of the selected webpage has been changed in comparison with text content of a webpage pre-stored in a database corresponding to the selected webpage.

8. The method according to claim 7, wherein whether the selected webpage has been changed is determined by comparing a hash-key value of text of the selected webpage with a hash-key value of text of the pre-stored webpage.

9. The method according to claim 7, wherein the pre-stored webpage is updated by the selected webpage if it is determined that the selected webpage has been changed.

10. A method of providing search results comprising:
determining whether a webpage selected by a first user is valid, the validity of the webpage being determined based on analysis of text content of the selected webpage;
receiving a search query from a second user, wherein search results obtained in response to the search query comprise the webpage selected by the first user;
correcting the search results obtained in response to the search query if it is determined that the webpage is not valid; and
providing the second user with the corrected search results.

11. The method according to claim 10, wherein the determining whether the selected webpage is valid comprises:
accessing, if it is detected that the webpage is selected by the first user, the selected webpage and analyzing validity of the selected webpage; and storing analysis results.

12. The method according to claim 10, wherein the correcting the search results is performed by deleting link information of the selected webpage from the search results or insert into the search results information that the selected webpage is not valid.

13. A non-transitory computer-readable storage medium comprising an executable program, which when executed, causes performance of the method of claim 1.

14. A system for providing search results comprising:
a processor;
an interfacing unit configured to receive first and second search queries from a first and second user respectively, and to provide the first and second users with first and second search results obtained in response to the first and second search queries, wherein second search results obtained in response to the second search query comprise a webpage included in the first search results and selected by the first user;
a validity determining unit configured to determine validity of the webpage included in the first search results and selected by the first user from the first search results, the validity of the webpage being determined based on analysis of text content of the selected webpage;
a data storage medium configured to store the database; and
a search results correcting unit configured to correct the second search results if it is determined by the validity determining unit that the selected webpage is invalid.

15. The system according to claim 14, wherein the validity determining unit comprises:
a detector configured to detect whether the webpage is selected by the first user;
an analyzer configured to access, if it detected that the webpage is selected by the first user, the selected webpage and to analyze the validity of the selected webpage; and
the data storage medium configured to store analysis results.

16. The system according to claim 14, wherein the search results correcting unit deletes a link information of the selected webpage from the second search results.

17. The system according to claim 14, wherein the search results correcting unit inserts into the second search results information indicating the selected webpage is not valid.

18. The system according to claim 14, wherein the validity determining unit determines whether the selected webpage has been deleted.

19. The system according to claim 14, wherein the validity determining unit determines whether text content of the selected webpage has been changed in comparison with text content of a webpage pre-stored in a database corresponding to the selected webpage.

20. The system according to claim 14, further comprising a searching unit configured to generate the first and second search results by executing a search in response to the first and second search queries.

* * * * *